(12) United States Patent
Dean et al.

(10) Patent No.: US 9,483,606 B1
(45) Date of Patent: Nov. 1, 2016

(54) LIFESCORE

(75) Inventors: Michael John Dean, Torrance, CA (US); Mark Joseph Kapczynski, Santa Monica, CA (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 913 days.

(21) Appl. No.: 13/543,669

(22) Filed: Jul. 6, 2012

Related U.S. Application Data

(60) Provisional application No. 61/505,974, filed on Jul. 8, 2011, provisional application No. 61/600,555, filed on Feb. 17, 2012.

(51) Int. Cl.
*G06F 17/00* (2006.01)
*G06Q 40/00* (2012.01)

(52) U.S. Cl.
CPC ............... *G06F 17/60* (2013.01); *G06Q 40/00* (2013.01)

(58) Field of Classification Search
USPC ......................................................... 707/748
See application file for complete search history.

(56) References Cited

U.S. PATENT DOCUMENTS

| | | |
|---|---|---|
| 4,775,935 A | 10/1988 | Yourick |
| 4,827,508 A | 5/1989 | Shear |
| 4,868,570 A | 9/1989 | Davis |
| 4,872,113 A | 10/1989 | Dinerstein |
| 4,935,870 A | 6/1990 | Burk, Jr. et al. |
| 5,056,019 A | 10/1991 | Schultz et al. |
| 5,247,575 A | 9/1993 | Sprague et al. |
| 5,325,509 A | 6/1994 | Lautzenheiser |
| 5,341,429 A | 8/1994 | Stringer et al. |
| 5,528,701 A | 6/1996 | Aref |
| 5,555,409 A | 9/1996 | Leenstra, Sr. et al. |
| 5,592,560 A | 1/1997 | Deaton et al. |
| 5,640,551 A | 6/1997 | Chu et al. |
| 5,655,129 A | 8/1997 | Ito |
| 5,659,731 A | 8/1997 | Gustafson |
| 5,666,528 A | 9/1997 | Thai |
| 5,737,732 A | 4/1998 | Gibson et al. |
| 5,754,938 A | 5/1998 | Herz et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |

(Continued)

FOREIGN PATENT DOCUMENTS

| | | |
|---|---|---|
| EP | 0 419 889 | 4/1991 |
| EP | 0 458 698 | 11/1991 |

(Continued)

OTHER PUBLICATIONS

U.S. Appl. No. 12/705,489, filed Feb. 12, 2010, Bargoli et al.

(Continued)

*Primary Examiner* — Hosain Alam
*Assistant Examiner* — Tuan-Khanh Phan
(74) *Attorney, Agent, or Firm* — Knobbe, Martens, Olson & Bear, LLP

(57) ABSTRACT

Methods and systems are disclosed that generate life scores for individuals based on various information associated with the individuals. For example, life scores may be based on data associated with several aspects of the individual's life, such as work, family, hobbies, education, etc. The life scores may be generated in realtime and/or periodically and provided to the individual and/or shared with others in various formats.

20 Claims, 16 Drawing Sheets

(56) References Cited

U.S. PATENT DOCUMENTS

| | | |
|---|---|---|
| 5,812,840 A | 9/1998 | Shwartz |
| 5,822,410 A | 10/1998 | McCausland et al. |
| 5,822,750 A | 10/1998 | Jou et al. |
| 5,822,751 A | 10/1998 | Gray et al. |
| 5,835,915 A | 11/1998 | Carr et al. |
| 5,881,131 A | 3/1999 | Farris et al. |
| 5,884,287 A | 3/1999 | Edesess |
| 5,905,985 A | 5/1999 | Malloy et al. |
| 5,926,800 A | 7/1999 | Baronowski et al. |
| 5,963,932 A | 10/1999 | Jakobsson et al. |
| 5,974,396 A | 10/1999 | Anderson et al. |
| 6,009,415 A | 12/1999 | Shurling et al. |
| 6,018,723 A | 1/2000 | Siegel et al. |
| 6,044,357 A | 3/2000 | Garg |
| 6,064,990 A | 5/2000 | Goldsmith |
| 6,073,140 A | 6/2000 | Morgan et al. |
| 6,121,901 A | 9/2000 | Welch et al. |
| 6,128,624 A | 10/2000 | Papierniak et al. |
| 6,144,957 A | 11/2000 | Cohen et al. |
| 6,151,601 A | 11/2000 | Papierniak et al. |
| 6,182,060 B1 | 1/2001 | Hedgcock et al. |
| 6,223,171 B1 | 4/2001 | Chaudhuri et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,304,869 B1 | 10/2001 | Moore et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,456,979 B1 | 9/2002 | Flagg |
| 6,460,036 B1 | 10/2002 | Herz |
| 6,496,819 B1 | 12/2002 | Bello et al. |
| 6,513,018 B1 | 1/2003 | Culhane |
| 6,523,022 B1 | 2/2003 | Hobbs |
| 6,523,041 B1 | 2/2003 | Morgan et al. |
| 6,574,623 B1 | 6/2003 | Laung et al. |
| 6,598,030 B1 | 7/2003 | Siegel et al. |
| 6,631,496 B1 | 10/2003 | Li et al. |
| 6,651,220 B1 | 11/2003 | Penteroudakis et al. |
| 6,658,393 B1 | 12/2003 | Basch et al. |
| 6,665,715 B1 | 12/2003 | Houri |
| 6,766,327 B2 | 7/2004 | Morgan, Jr. et al. |
| 6,804,701 B2 | 10/2004 | Muret et al. |
| 6,983,478 B1 | 1/2006 | Grauch et al. |
| 7,003,504 B1 | 2/2006 | Angus et al. |
| 7,003,792 B1 | 2/2006 | Yuen |
| 7,028,052 B2 | 4/2006 | Chapman et al. |
| 7,039,607 B2 | 5/2006 | Watarai et al. |
| 7,047,251 B2 | 5/2006 | Reed et al. |
| 7,082,435 B1 | 7/2006 | Guzman et al. |
| 7,136,448 B1 | 11/2006 | Venkataperumal et al. |
| 7,184,974 B2 | 2/2007 | Shishido |
| 7,185,016 B1 | 2/2007 | Rasmussen |
| 7,200,602 B2 | 4/2007 | Jonas |
| 7,240,059 B2 | 7/2007 | Bayliss et al. |
| 7,277,900 B1 | 10/2007 | Ganesh et al. |
| 7,296,734 B2 | 11/2007 | Pliha |
| 7,370,044 B2 | 5/2008 | Mulhern et al. |
| 7,376,603 B1 | 5/2008 | Mayr et al. |
| 7,383,227 B2 | 6/2008 | Weinflash et al. |
| 7,403,942 B1 | 7/2008 | Bayliss |
| 7,467,127 B1 | 12/2008 | Baccash et al. |
| 7,536,346 B2 | 5/2009 | Aliffi et al. |
| 7,596,512 B1 | 9/2009 | Raines et al. |
| 7,653,593 B2 | 1/2010 | Zarikian et al. |
| 7,668,840 B2 | 2/2010 | Bayliss et al. |
| 7,672,865 B2 | 3/2010 | Kumar et al. |
| 7,698,163 B2 | 4/2010 | Reed et al. |
| 7,707,059 B2 | 4/2010 | Reed et al. |
| 7,707,122 B2 | 4/2010 | Hull et al. |
| 7,725,300 B2 | 5/2010 | Pinto et al. |
| 7,742,982 B2 | 6/2010 | Chaudhuri et al. |
| 7,747,480 B1 | 6/2010 | Agresta et al. |
| 7,787,869 B2 | 8/2010 | Rice et al. |
| 7,954,698 B1 | 6/2011 | Pliha |
| 7,991,666 B2 | 8/2011 | Haggerty et al. |
| 7,991,689 B1 | 8/2011 | Brunzell et al. |
| 8,001,042 B1 | 8/2011 | Brunzell et al. |
| 8,005,759 B2 | 8/2011 | Hirtenstein et al. |
| 8,024,264 B2 | 9/2011 | Chaudhuri et al. |
| 8,065,233 B2 | 11/2011 | Lee et al. |
| 8,078,528 B1 | 12/2011 | Vicente et al. |
| 8,135,642 B1 | 3/2012 | Krause |
| 8,234,498 B2 | 7/2012 | Britti et al. |
| 8,271,378 B2 | 9/2012 | Chaudhuri et al. |
| 8,296,229 B1 | 10/2012 | Yellin et al. |
| 8,301,574 B2 | 10/2012 | Kilger et al. |
| 8,364,518 B1 | 1/2013 | Blake et al. |
| 8,364,588 B2 | 1/2013 | Celka et al. |
| 8,392,334 B2 | 3/2013 | Hirtenstein et al. |
| 2001/0037332 A1 | 11/2001 | Miller et al. |
| 2001/0049620 A1 | 12/2001 | Blasko |
| 2002/0077964 A1 | 6/2002 | Brody et al. |
| 2002/0099628 A1 | 7/2002 | Yakaoka et al. |
| 2002/0138297 A1 | 9/2002 | Lee |
| 2002/0173984 A1 | 11/2002 | Robertson et al. |
| 2002/0184255 A1 | 12/2002 | Edd et al. |
| 2002/0194103 A1 | 12/2002 | Nabe |
| 2003/0018549 A1 | 1/2003 | Fei et al. |
| 2003/0097380 A1 | 5/2003 | Mulhern et al. |
| 2003/0105728 A1 | 6/2003 | Yano et al. |
| 2003/0171942 A1 | 9/2003 | Gaito |
| 2003/0212654 A1 | 11/2003 | Harper et al. |
| 2004/0030649 A1 | 2/2004 | Nelson et al. |
| 2004/0062213 A1 | 4/2004 | Koss |
| 2004/0102197 A1 | 5/2004 | Dietz |
| 2004/0122735 A1 | 6/2004 | Meshkin |
| 2004/0128150 A1 | 7/2004 | Lundegren |
| 2004/0128230 A1 | 7/2004 | Oppenheimer et al. |
| 2004/0153448 A1 | 8/2004 | Cheng et al. |
| 2004/0205157 A1 | 10/2004 | Bibelnieks et al. |
| 2004/0220896 A1 | 11/2004 | Finlay et al. |
| 2004/0225596 A1 | 11/2004 | Kemper et al. |
| 2004/0243588 A1 | 12/2004 | Tanner et al. |
| 2005/0004805 A1 | 1/2005 | Srinivasan |
| 2005/0027633 A1 | 2/2005 | Fortuna et al. |
| 2005/0050027 A1 | 3/2005 | Yeh et al. |
| 2005/0154664 A1 | 7/2005 | Guy et al. |
| 2005/0197954 A1 | 9/2005 | Maitland et al. |
| 2005/0209922 A1 | 9/2005 | Hofmeister |
| 2005/0288954 A1 | 12/2005 | McCarthy et al. |
| 2006/0080251 A1 | 4/2006 | Fried et al. |
| 2006/0242048 A1 | 10/2006 | Haggerty et al. |
| 2006/0293921 A1 | 12/2006 | McCarthy et al. |
| 2007/0011039 A1 | 1/2007 | Oddo |
| 2007/0160458 A1 | 7/2007 | Yen |
| 2007/0168246 A1 | 7/2007 | Haggerty et al. |
| 2007/0226093 A1 | 9/2007 | Chan et al. |
| 2007/0288360 A1 | 12/2007 | Seeklus |
| 2008/0065774 A1 | 3/2008 | Keeler |
| 2008/0120155 A1 | 5/2008 | Pliha |
| 2008/0221970 A1 | 9/2008 | Megdal et al. |
| 2008/0221990 A1 | 9/2008 | Megdal et al. |
| 2008/0228556 A1* | 9/2008 | Megdal et al. ............ 705/10 |
| 2008/0301016 A1 | 12/2008 | Durvasula et al. |
| 2009/0043637 A1 | 2/2009 | Eder |
| 2009/0076883 A1 | 3/2009 | Kilger et al. |
| 2009/0198557 A1 | 8/2009 | Wang et al. |
| 2009/0198602 A1 | 8/2009 | Wang et al. |
| 2009/0276368 A1 | 11/2009 | Martin et al. |
| 2009/0327054 A1 | 12/2009 | Yao et al. |
| 2009/0327120 A1* | 12/2009 | Eze et al. ............ 705/38 |
| 2010/0094774 A1 | 4/2010 | Jackowitz et al. |
| 2010/0145847 A1 | 6/2010 | Zarikian et al. |
| 2010/0257577 A1 | 10/2010 | Grandison et al. |
| 2010/0332292 A1 | 12/2010 | Anderson |
| 2011/0071950 A1 | 3/2011 | Ivanovic |
| 2011/0145122 A1 | 6/2011 | Haggerty et al. |
| 2011/0184838 A1 | 7/2011 | Winters et al. |
| 2011/0251946 A1 | 10/2011 | Haggerty et al. |
| 2011/0270618 A1 | 11/2011 | Banerjee et al. |
| 2011/0276396 A1* | 11/2011 | Rathod ............ 705/14.49 |
| 2012/0047219 A1 | 2/2012 | Feng et al. |
| 2012/0158574 A1 | 6/2012 | Brunzell et al. |

(56) References Cited

U.S. PATENT DOCUMENTS

| | | | |
|---|---|---|---|
| 2012/0216125 A1 | 8/2012 | Pierce | |
| 2012/0323954 A1 | 12/2012 | Bonalle et al. | |
| 2013/0173450 A1 | 7/2013 | Celka et al. | |
| 2013/0173481 A1 | 7/2013 | Hirtenstein et al. | |
| 2013/0218638 A1 | 8/2013 | Kilger et al. | |
| 2013/0218751 A1 | 8/2013 | Chaudhuri et al. | |

FOREIGN PATENT DOCUMENTS

| | | | | |
|---|---|---|---|---|
| EP | 0 559 358 | | 9/1993 | |
| EP | 0 977 128 | | 2/2000 | |
| EP | 1 077 419 | | 2/2001 | |
| EP | 0 772 836 | | 12/2001 | |
| EP | 2 088 743 | | 8/2009 | |
| EP | 2151793 | A1 * | 2/2010 | ............ G06Q 10/10 |
| JP | 10-222559 | | 8/1998 | |
| JP | 10-261009 | | 9/1998 | |
| JP | 2000-331068 | | 11/2000 | |
| JP | 2001-297141 | | 10/2001 | |
| JP | 2001-344463 | | 12/2001 | |
| JP | 2001-357256 | | 12/2001 | |
| JP | 2002-149778 | | 5/2002 | |
| JP | 2002-163498 | | 6/2002 | |
| JP | 2002-259753 | | 9/2002 | |
| JP | 2003-271851 | | 9/2003 | |
| JP | 2003-316881 | | 11/2003 | |
| KR | 10-2000-0036594 | | 7/2000 | |
| KR | 10-2000-0063995 | | 11/2000 | |
| KR | 10-2001-0016349 | | 3/2001 | |
| KR | 10-2001-0035145 | | 5/2001 | |
| KR | 10-2002-0007132 | | 1/2002 | |
| WO | WO 95/34155 | | 12/1995 | |
| WO | WO 96/00945 | | 1/1996 | |
| WO | WO 97/23838 | | 7/1997 | |
| WO | WO 98/41931 | | 9/1998 | |
| WO | WO 98/41932 | | 9/1998 | |
| WO | WO 98/41933 | | 9/1998 | |
| WO | WO 99/17225 | | 4/1999 | |
| WO | WO 99/17226 | | 4/1999 | |
| WO | WO 99/22328 | | 5/1999 | |
| WO | WO 99/38094 | | 7/1999 | |
| WO | WO 00/04465 | | 1/2000 | |
| WO | WO 00/28441 | | 5/2000 | |
| WO | WO 2008/022289 | | 2/2008 | |
| WO | WO 2008/147918 | | 12/2008 | |
| WO | WO 2010/062537 | | 6/2010 | |

OTHER PUBLICATIONS

U.S. Appl. No. 12/705,511, filed Feb. 12, 2010, Bargoli et al.
BackupBox, http://mybackupbox.com printed Feb. 8, 2013 in 2 pages.
Bult et al., "Optimal Selection for Direct Mail," Marketing Science, 1995, vol. 14, No. 4, pp. 378-394.
Caliendo, et al., "Some Practical Guidance for the Implementation of Propensity Score Matching", IZA: Discussion Paper Series, No. 1588, Germany, May 2005, pp. 32.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Elmasri et al., "Fundamentals of Database Systems, Third Edition (Excerpts)", Jun. 2000, pp. 253, 261, 268-270, 278-280, 585, 595.
Haughton et al., "Direct Marketing Modeling with CART and CHAID", Journal of Direct Marketing, Fall 1997, vol. 11, No. 4, pp. 42-52.
Hojoki, http://hojoki.com printed Feb. 8, 2013 in 5 pages.
IFTTT, "About IFTTT", http://ifttt.com/wtf printed Feb. 18, 2013 in 4 pages.
"Intelligent Miner Applications Guide", IBM Corp., Apr. 2, 1999, Chapters 4-7, pp. 33-132.
"Japan's JAAI system appraises used cars over internet", Asia Pulse, Mar. 3, 2000.
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Miller, Joe, "NADA used-car prices go online", Automotive News, Jun. 14, 1999, p. 36.
Mint.com, http://www.mint.com/how-it-works/ printed Feb. 5, 2013 in 2 pages.
Mover, "One API for the Cloud", http://mover.io printed Feb. 6, 2013 in 3 pages.
Otixo, "Your Dashboard for the Cloud", http://Otixo.com/product printed Feb. 6, 2013 in 3 pages.
Pipes, http://pipes.yahoo.com/pipes printed Feb. 18, 2013 in 1 page.
Planwise, http://planwise.com printed Feb. 8, 2013 in 5 pages.
Primadesk, http://primadesk.com printed Feb. 8, 2013 in 1 page.
Sawyers, Arlene, "NADA to Offer Residual Guide", Automotive News, May 22, 2000, p. 3.
Schmittlein et al., "Customer Base Analysis: An Industrial Purchase Process Application", Marketing Science, vol. 13, No. 1 (Winter 1994), pp. 41-67.
ServiceObjects, "DOTS Web Services—Product Directory", http://www.serviceobjects.com/products/directory_of_web_services. asp printed Aug. 17, 2006 in 4 pages.
Storage Made Easy(SME), http://storagemadeeasy.com printed Feb. 6, 2013 in 1 page.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.
Tao, Lixin, "Shifting Paradigms with the Application Service Provider Model"; Concordia University, IEEE, Oct. 2001, Canada.
Thoemmes, Felix, "Propensity Score Matching in SPSS", Center for Educational Science and Psychology, University of Tübingen, Jan. 2012.
"WashingtonPost.com and Cars.com launch comprehensive automotive web site for the Washington area", PR Newswire, Oct. 22, 1998.
Working, Holbrook, "Statistical Laws of Family Expenditure", Journal of the American Statistical Association, pp. 43-56, vol. 38, American Statistical Association, Washington, D.C., Mar. 1943.
Zapier, "Integrate Your Web Services", http://www.Zapier.com printed Feb. 18, 2013 in 3 pages.

* cited by examiner

Score Calculation

+20 age  +20 location
−5 pollution exposure

+20 web presence
−5 privacy exposure

+20 search ranking
−5 malware link exposure

−10 privacy exposure

60

- You are a 22 year old female living in Los Angeles, CA
- You have 4 social network accounts, 1 of which is public
- You're name shows up 37 times in search results
- You're email is being used for 3rd party marketing purposes

Figure 1C

LIFESCORE

CROSS-REFERENCE TO RELATED APPLICATIONS

This application claims the benefit of priority under 35 U.S.C. §119(e) of U.S. Provisional Application No. 61/505,974, filed Jul. 8, 2011 and U.S. Provisional Application No. 61/600,555, filed Feb. 17, 2012, the disclosures of which are hereby incorporated by reference in their entireties.

BACKGROUND

Information regarding consumers is becoming increasingly available in digital formats.

SUMMARY

A LifeScore is a score that represents an individual's overall position in life. Similar to other scores, such as a credit score, a LifeScore changes as a consumer's experiences, financial situation, family situation, and/or other events associated with consumer change. A LifeScore may be based on various data associated with an individual, such as data that is acquired from one or more accounts of the individual (e.g., social network, cell phone, gaming, etc.), observations of the individual (e.g., movement, travel, time sleeping, etc.) and/or information derived from combinations of data (e.g., an increase in stress level may be inferred by an increase in time at the office in combination with an increased weight).

BRIEF DESCRIPTION OF THE DRAWINGS

FIG. 1C shows an example of a score calculation, such as the calculation of the initial LifeScore for the individual illustrated in FIG. 1B.

FIGS. 11A-11H are sample user interfaces on a mobile device that show various features available from a LifeScore system.

DETAILED DESCRIPTION

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

LifeScore Segments

In one embodiment, a LifeScore may comprise multiple segment scores that are based on different segments of an individual's life. For example, a LifeScore may be generated based on scores for one or more of a work, family, hobby, health, religion, education, and/or other aspects of an individual's life. In one embodiment, the segment scores may be generated based on any available information regarding the individual, such as historical information and/or real-time information. Thus, segment scores may vary in real time, which may also cause the LifeScore of the individual to also change in real time. While the term LifeScore is used throughout this detailed description, a LifeScore and/or LifeScore segment may be referred to by other terms, such as indicators or simply scores, associated with various adjectives, such as life, happiness, status, reputation, prestige, etc.

Figure 1A:
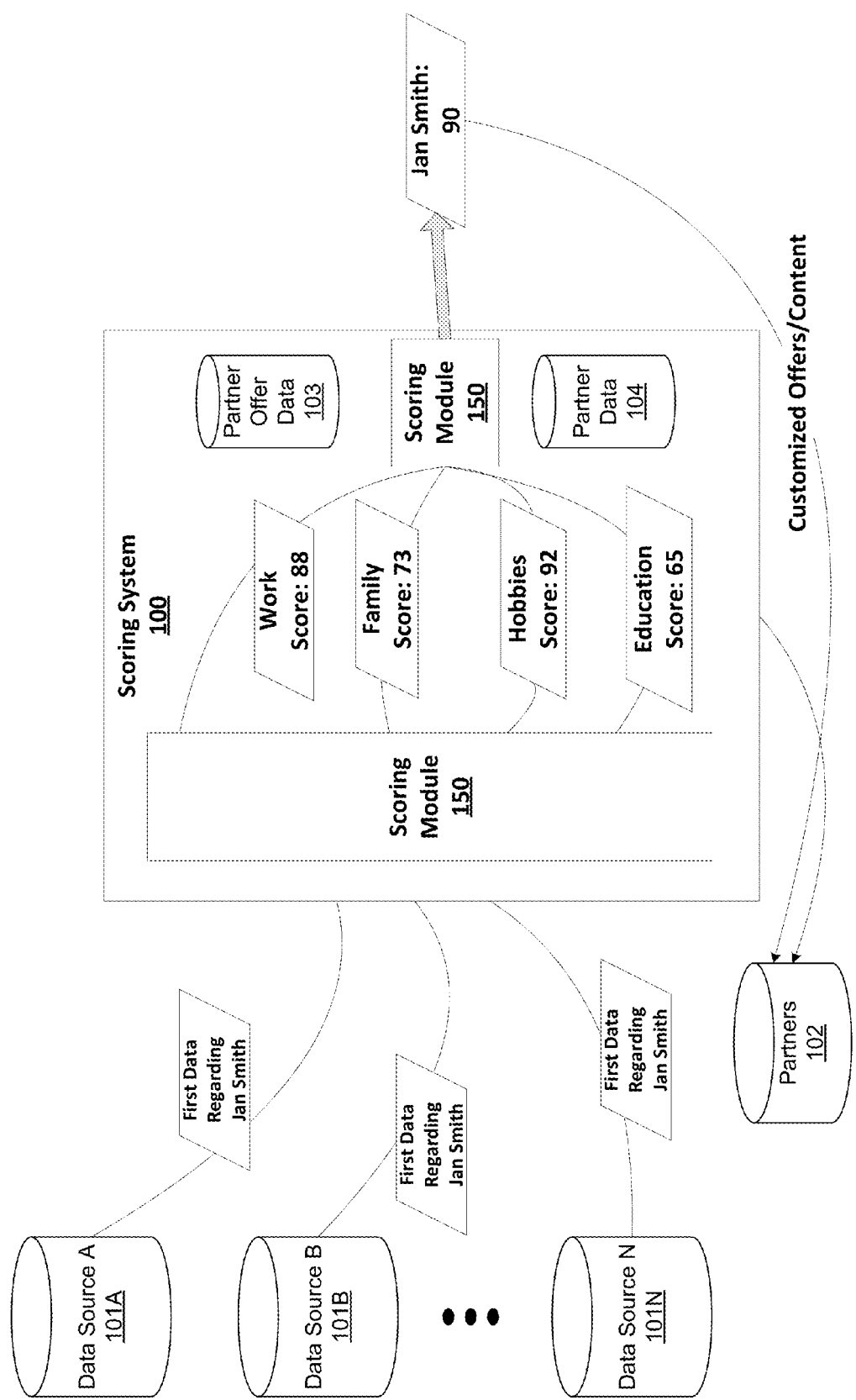
FIG. 1A is a block diagram illustrating one embodiment of a scoring device that receives data from multiple data sources and generates LifeScores for individuals.
Figure 12:
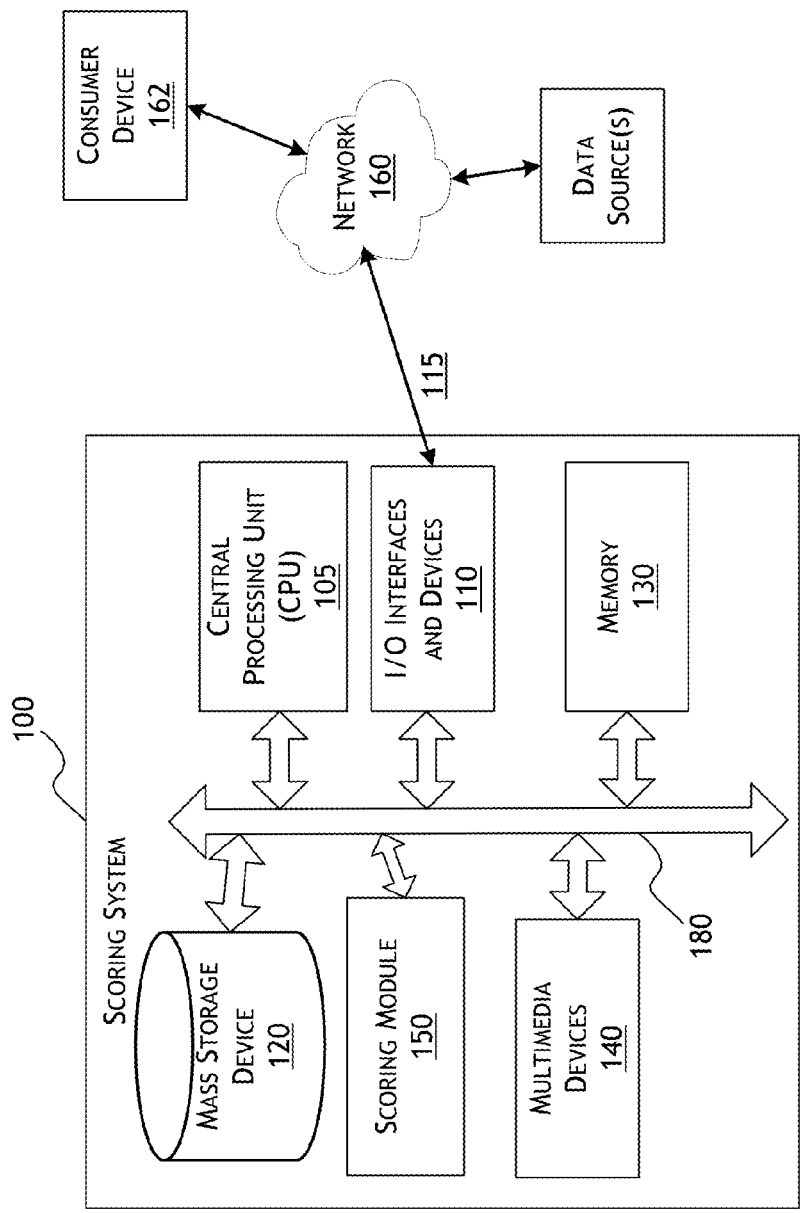
FIG. 12 is a block diagram showing an embodiment in which a scoring computing system is in communication with a network and various systems are also in communication with the network.

FIG. 1A is a block diagram illustrating one embodiment of a scoring system 100 that receives data from multiple data sources and generates LifeScores for individuals. In the embodiment of FIG. 1A, a specific example with respect to an individual, Jan Smith, is shown. The scoring system illustrated in FIG. 1A may comprise any suitable computer device, such as one or more computer servers, desktop, or portable devices. FIG. 12, discussed below, illustrates example components and operations of the scoring system 100.

In this embodiment, data regarding Jan Smith is received from three or more data sources 101 (including data sources 101A, 101B, and 101N). Depending on the embodiment, data may be received from any number of data sources. For example, a first data source may comprise credit data, while a second data source may comprise calendar data that indicates certain activities of Jan Smith. Other data sources may include data from social networks, financial accounts, browser history and/or activity, real-time data regarding location and/or current activities of the individual (e.g., based on geolocation and/or other sensor data of a mobile device of the individual), or any other type of data. In one embodiment a data source comprises social network data that is scanned and analyzed by the scoring device in order to identify words, phrases, images, etc., that are indicative of a mood, sentiment, activity level, or happiness level of the individual, for example. Such information may be used in developing one or more segment scores for an individual and/or a LifeScore for the individual.

In the particular embodiment of FIG. 1A, the scoring system 100 includes a scoring module 150 configured to access data regarding individuals (e.g., data provided by the data sources 101) and to generate one or more LifeScore segment scores and/or overall LifeScores for respective individuals. The scoring module 150 may include one or more our algorithms and/or models configured to process data received from one or more data sources in order to generate the LifeScore and/or LifeScore segment scores.

In the embodiment of FIG. 1A, the scoring module 150 generates four segment scores for Jan Smith and then uses one or more of the segment scores, such as according to a model that weights different segments scores, to generate an overall LifeScore for Jan Smith. In this example, the scoring system 100 determines a work score of 88, a family score of 73, a hobbies score of 92, and an education score of 65 for Jan Smith. The scoring system 100 (e.g., the scoring module 150) may then combine the segments scores, such as by averaging the segment scores or applying a weighted model, in order to generate the LifeScore of 90 for Ms. Smith.

Marketing Opportunities

FIG. 1A also illustrates communications with a partner 102, such that offers can be provided to LifeScore users based on respective LifeScores, or components of Life-Scores. In one embodiment, personal information of individuals that are subscribed to a LifeScore service may be provided to retail partners in order to allow the retail partners to provide targeted advertising offers to individuals. The LifeScore provider may receive, in exchange for the provision of personal information of individuals, advertising on the various retail partners' websites (or other media). Thus, the LifeScore service may receive increased membership and the marketing partner 102 may increase their advertising effectiveness by targeting products/services to individuals. For example, marketing partner 102 may provide individuals with discounts on certain products based on a LifeScore reaching a particular level. For example, a first marketing partner 102 may provide a discount on a first product when an individual's LifeScore reaches 80, while a second marketing partner may provide a discount on a second product when the individuals LifeScore reaches 85, and so on. Such promotional offers may further incentivize user's to provide additional information to the LifeScore service in order to potentially increase the user's LifeScore.

In the embodiment of FIG. 1A, the scoring system 100 stores information regarding partner offers, such as discounts, coupons, time/location-based specials, quantity of offers available, time frame in which to provide offers, and other information regarding offers that particular partners are willing to offer its customers, in partner offer data store 103. In other embodiments, the partner offer may be stored elsewhere, such as local to the partner and/or at a networked location that is available to the scoring system 100.

In the embodiment of FIG. 1A, the scoring system 100 may also store partner data, such as retail locations of various participating retailers, store hours, contact information, etc., in a partner data store 104. In other embodiments, the partner data may be stored elsewhere, such as local to the partner and/or at a networked location that is available to the scoring system 100. Thus, companies that partner with the provider of the scoring system 100 may determine whom offers should be provided to, based on the user's LifeScores or LifeScore component scores. For example, a food retailer may provide offers based on an algorithm that determines who would appreciate a free food item the most, such as an algorithm that identifies decreases in components related to income and/or job satisfaction (and possibly a required rate of change of the components). Alternately, the food retailer, or other partner, may determine who to provide offers to based on a probable profitability associated with providing offers to respective individuals. For example, even though a particular consumer purchases product from a partner regularly, an offer may be provided to other individuals that don't regularly purchase from the partner in order to potentially provide new business to the partner. In this embodiment, the consumer that frequents the partner may still receive less periodic "appreciation" offers, to keep the consumer happy.

Depending on the embodiment, the scoring system 100 may also determine specific offers to be provided to consumers from partners and/or actually provide the offers to the consumers, via any available communication medium, such as via e-mail, text message, or message to a mobile application, for example. Alternatively, the partners 102 may have access to portions of the scoring system 100 data, such as historical LifeScore data for confirmed customers of the partner, or possibly potential customers of the partner, such that partners 102 can determine offers independently of the scoring device based on the LifeScore data provided by the scoring system 100.

In one embodiment, offers from partners 102 that are available to consumers are made known to consumers so that they can set goals to receive certain desired offers. For example, a partner 102 may offer a discount on a product if a consumer increases a particular score component, such as an education score, by a set amount or percentage, which may incentivize certain consumers to take actions to increase their education score component.

Depending on the embodiment, the offers from partners may include discounts on products and/or services, and/or may include a reward of something for free (e.g., without requiring purchase of a product). Thus, references herein to "offers" refer to coupons, discounts, other offers, and/or rewards for products/services that are provided gratis.

Figure 1B:
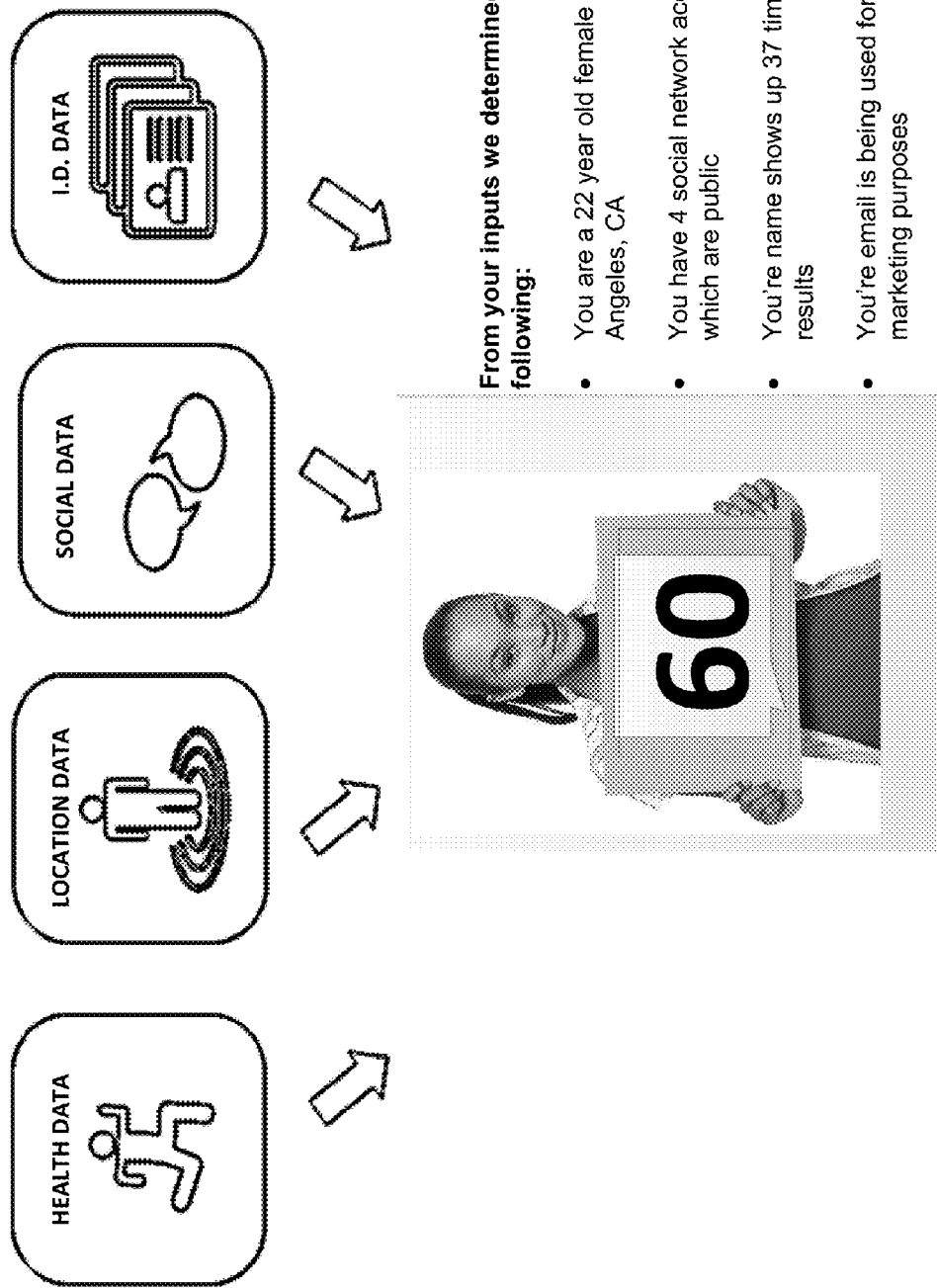
FIG. 1B is a diagram illustrating sample data that may be used in order to generate a LifeScore for an individual, such as an initial LifeScore of the individual.

FIG. 1B is a diagram illustrating sample data that may be used in order to generate a LifeScore for an individual, such as an initial LifeScore of the individual. In this embodiment, a LifeScore is determined based on health data, location data, social media data, and identification data. As discussed herein, less or additional information may be used in order to determine an individual's LifeScore.

In the example of FIG. 1B, a sample initial LifeScore of 60 is calculated for an individual based on information in each of these four categories. In one embodiment, the information in each of the illustrated categories is partially or fully self-reported by the consumer and used to generate the initial LifeScore and/or provide information to the LifeScore system 100 that is usable to establish data links to other data providers. Alternatively, data that is used to determine the user's initial LifeScore (e.g., the data listed to the right in FIG. 1B) may be partially or fully acquired from outside data sources (e.g., the user may not be required to provide any input into the system, or possibly minimal input in certain embodiments, such as name and address).

The illustrated individual provides information indicating that she is a 22 year old female living in Los Angeles Calif., with four social networking accounts (three of which are public). In one embodiment, the scoring system scans the Internet for additional information regarding the individual, such as the number of times the individual's name shows up in search results (37 in the example of FIG. 1B), uses of the individual's identity in social networks, uses of the individual's e-mail address (e.g., by third-party marketers), and/or any other uses of information associated with the individual.

FIG. 1C shows an example of a score calculation, such as the calculation of the initial LifeScore for the individual illustrated in FIG. 1B. In this embodiment, the user's LifeScore was increased based on the user's age, location, web presence, and search ranking, but reduced based on the user's pollution exposure, privacy exposure in social networks, malware link exposure, and privacy exposure in e-mail marketing. In this embodiment, a total of the positive and negative contributions to the individual's score is 60, thus providing an initial LifeScore of 60 to the individual. In other embodiments, other characteristics of (or associated with) the individual may be used to determine an initial and/or subsequent LifeScores. Additionally, the LifeScores may be expressed in different formats, such as on a different scale (0 to 10, 0 to 1000, A-F, 300-850, etc.), as graphical indicators (icons of different smiley/frowny faces), or in any other manner.

Figure 1D:
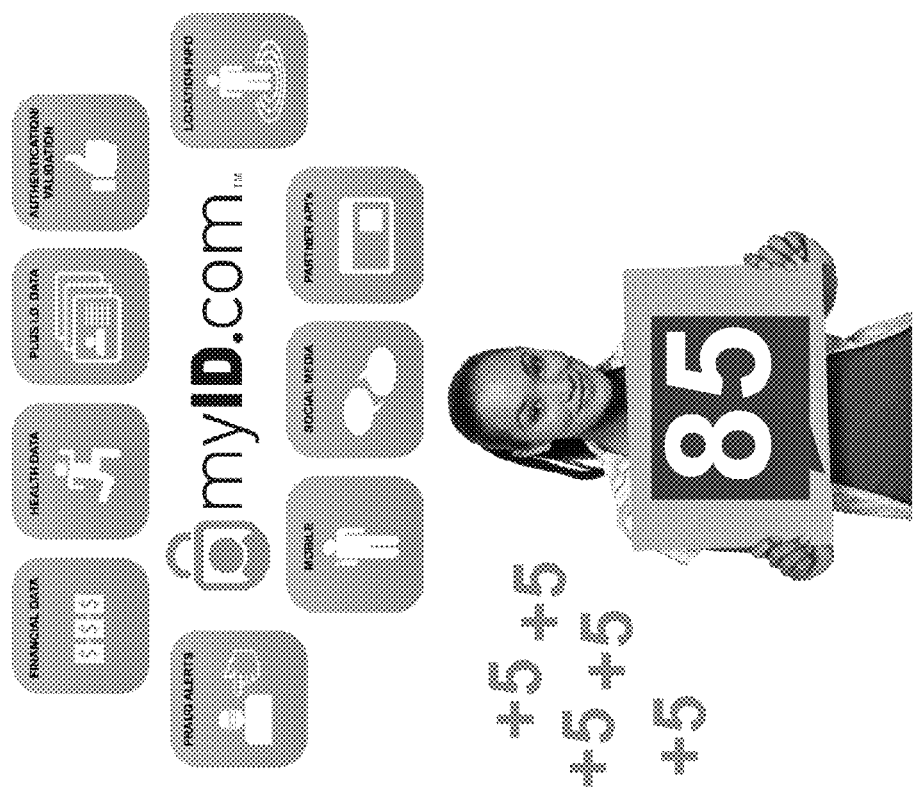
FIG. 1D is a diagram illustrating sample categories of information that may be provided to update the user's LifeScore.
Figure 10:
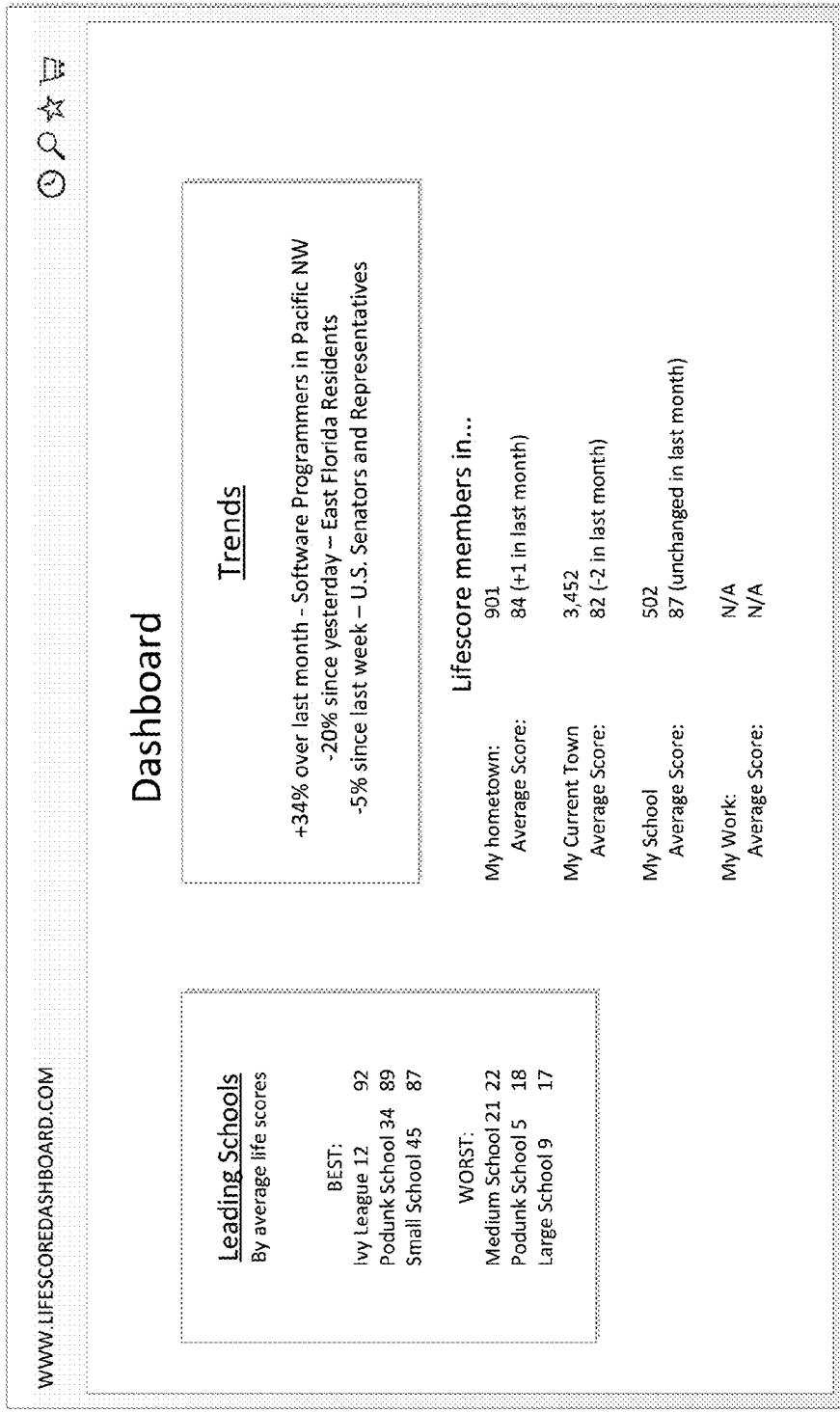
FIG. 10 is a user interface that may be provided as a dashboard or homepage for a user accessing a LifeScore account (or a visitor to a LifeScore website), such as via a web browser or standalone application.

FIG. 10 is a diagram illustrating sample categories of information that may be provided to update the user's LifeScore. In addition to those categories previously discussed, FIG. 1D also indicates that financial data, additional ID data, authentication/validation data, fraud alerts data, mobile data, and/or partner API data, may be used in updating the user's score. FIG. 1D also indicates some specific types of information that may be provided in one embodiment to increase a user's LifeScore. For example, in one embodiment the user may set up a personal profile to manage and authenticate the user's identity in order to increase the user's LifeScore. Similarly, in one embodiment the user may adjust privacy settings on one or more social networks in order to increase the user's LifeScore. Other examples of actions that may be taken to increase the user's LifeScore are also illustrated.

LifeScore Registration

In one embodiment, registration for generation of a LifeScore requires an individual to provide only one or a few pieces of information. Subsequently, as the individual provides further information, and/or as further information is discovered regarding the individual from one or more data sources, the LifeScore of the individual may be dynamically updated.

Figure 2:
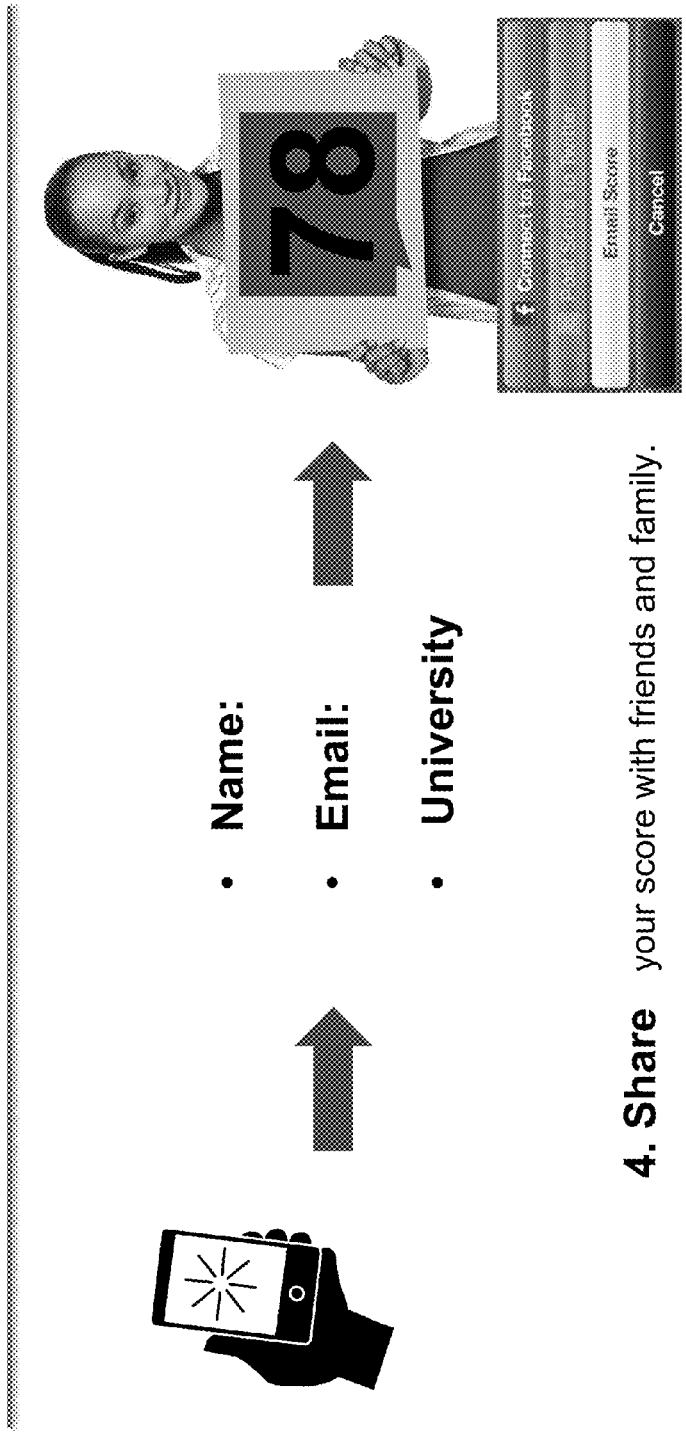
FIG. 2 is a diagram illustrating basic steps that may be performed in order for a consumer to receive their LifeScore.

FIG. 2 is a diagram illustrating basic steps that may be performed in order for a consumer to receive their LifeScore. In this embodiment, the process is initiated by the individual downloading a mobile app to a mobile device. In other embodiments, the registration may be performed via an online interface, such as an interface that is accessible on any computing device, including both a mobile computing device and a desktop computing device. Alternatively, the registration information may be provided to a LifeScore representative (e.g., at a mall kiosk), via telephone, or via any other means.

Next, the individual provides three pieces of information, namely, the individual's name, e-mail address, and University. In other embodiments, the individual may provide less or additional information as part of an initial registration process. However, by minimizing the amount of information required to register an individual, the quantity of registrations may be increased. Subsequently, after the individual has an initial LifeScore, the individual may be motivated to provide additional information to the scoring system in order to increase the individual's LifeScore, such as through offering rewards from partners in response to providing further information usable to update LifeScores and/or improving LifeScores. Additionally, the scoring system may retrieve various information regarding the individual from one or more data sources that may affect the individual's LifeScore (either positively or negatively).

In the example of FIG. 2, the individual is provided with an initial LifeScore that is based on the three pieces of information provided. The individual may then share the LifeScore with friends and family via one or more networking means, such as directly via e-mail or SMS, or by posting on social networking sites, such as Facebook or Twitter.

In one embodiment, the individual is provided with an opportunity to determine what information is shared with others. For example, the individual may select a first set of information that can be shared with friends/acquaintances (such as may be determined via "link" or "connection" information on one or more social networking sites, or separately via the LifeScore application), and another set of information that can be shared publicly.

Realtime Scoring

As noted above, in one embodiment LifeScores are updated in real time, such that an individual's LifeScore may change multiple times throughout a single day, or even a single hour. For example, an individual's LifeScore may decrease when the individual arrives at a job that the individual doesn't care for, and conversely, the individual's LifeScore may increase when the individual leaves that same job. A LifeScore may increase or decrease in response to the system automatically scanning of e-mails, text messages, and/or other personal information of the individual. For example, a user's LifeScore may increase as the quantity of text messages from friends increases. Similarly, the real-time location of the individual may affect the current LifeScore of the individual. For example, if an individual is determined to be at Disneyland, the LifeScore of the individual may increase. However, if the individual is determined to be located at a funeral home, the LifeScore of the individual may decrease. The scoring system may include various logic for associating geolocation data of an individual (such as lat/lon information from a mobile device of the user) with businesses, activities, friends, and/or other items located at the individual's location, and to then associate those geographic locations (or possibly the type of individuals, businesses, etc. at the geographic location) with characteristics of the individual in order to determine if the individual's geographic location should cause an increase or decrease, or no change at all, in the real-time LifeScore.

In one embodiment, the individual installs an application on their device (e.g., the individual's cell phone, tablet, or desktop computer) that has access to personal information of the individual (e-mails, text messages, calendar, etc.). The application may periodically, or continuously, access such data and provide summary information to the LifeScore scoring device (e.g. the scoring device of FIG. 1A) that may be useful in updating the individuals LifeScore. In other embodiments, the application installed on the individual's device may operate autonomously, such that the individual's LifeScore may be updated based on information on the device, as well as possibly other information received at the device. In this embodiment, the device may periodically update the individual's LifeScore for the individual with the scoring device such that the LifeScore may be provided to others, such as based on the assigned rights that the individual has provided.

Figure 3:
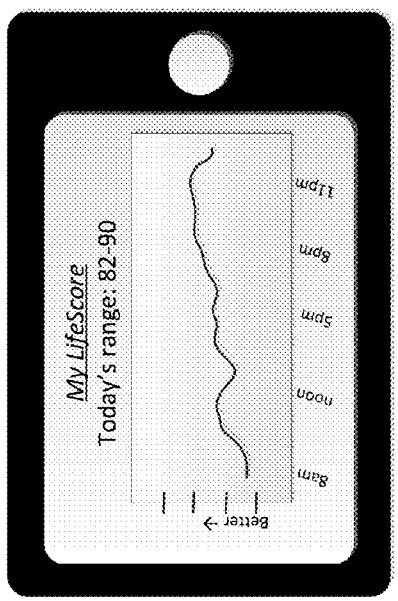
FIG. 3 illustrates an example user interface on a mobile device that shows a user's LifeScore over the course of a day.

In one embodiment, the individual is provided with a "heartbeat" like display that shows the individual's LifeScore over a period of time. FIG. 3 illustrates an example user interface on a mobile device that shows a user's LifeScore over the course of a day. Other user interfaces that display the LifeScore in other manners, such as in a graph or list format, for example, may also be used. Additionally, LifeScores for different periods, such as multiple days, weeks, months, or years, may be displayed.

In FIG. 3, the particular user's LifeScore starts at about 82 at the beginning of the day and fluctuates up and down to a maximum of 90 at about 11 PM before dipping down slightly. In one embodiment, the graphical indication of the users LifeScore is provided in a real-time manner, such that at 5 PM the user's data for the day up to about 5 PM is available.

In one embodiment, the LifeScore graphic (such as the graph of FIG. 3) may be annotated at certain points to indicate events that contributed to particular changes in the LifeScore. For example, an icon may be placed on the graph that can be selected in order to display more information regarding a particular change in LifeScore.

Sharing of LifeScores

Figure 4:
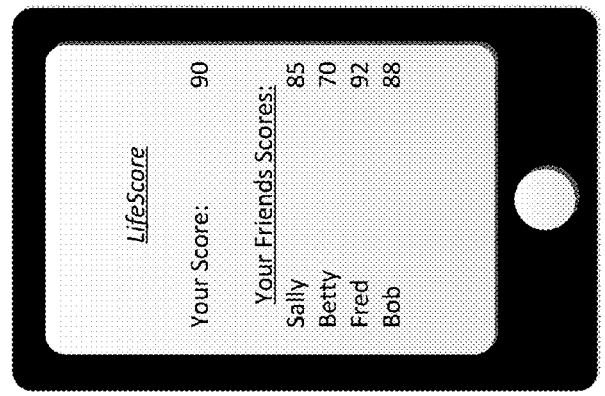
FIG. 4 illustrates an example user interface that allows a user to view the user's current LifeScore, as well as those of others, such as friends of the user.

LifeScores may advantageously be shared among various user groups, such as a group of friends or family members. FIG. 4 illustrates an example user interface that allows a user to view the user's current LifeScore, as well as those of others, such as friends of the user. In one embodiment, LifeScores of friends may be updated in realtime also, so that the user can view changes in friends LifeScores. Sharing of LifeScores may be performed in any manner, such as via social networks, weblogs, email, SMS, or any other medium. As noted above, information regarding LifeScores of others (such as the comparisons of FIGS. 4 and 5) may be limited based on authorization rights provided by the particular individuals. For example, one individual may allow Jan Smith to access all of her available data, including details on individual LifeScore components, while another individual may allow Jan Smith to only access her overall LifeScore.

Figure 5:
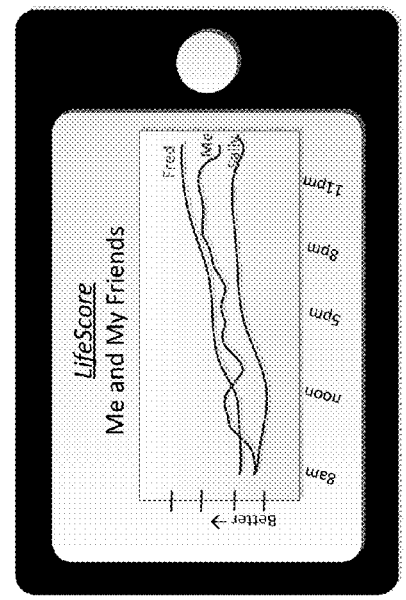
FIG. 5 is a diagram illustrating that LifeScores adjust over time based on life activities of the user.

FIG. 5 is a diagram illustrating that LifeScores adjust over time based on life activities of the user. For example, positive behaviors increase the users LifeScore, while negative behaviors decrease the users LifeScore. The definition of positive and negative behaviors may be customized based on many factors, such as preferences of the LifeScore provider, user preferences, user characteristics, or any other relevant attribute. In addition, the example of FIG. 5 illustrates sharing of LifeScores between friends. In this example, the LifeScore of the individual (e.g., Jan Smith) is shown, as well as the LifeScores of two friends, Fred and Sally. This user interface allows a user to track LifeScores of friends in a real-time manner, or to track histories of friends LifeScores.

Figure 6A:
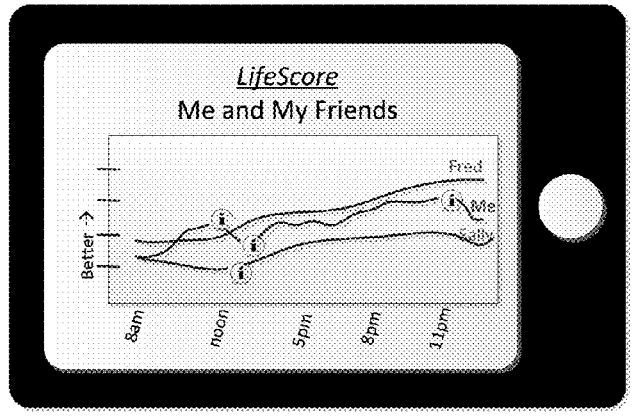
FIG. 6A illustrates the same LifeScore graphs as FIG. 5, but with additional information icons at various locations on the graph.
Figure 6B:
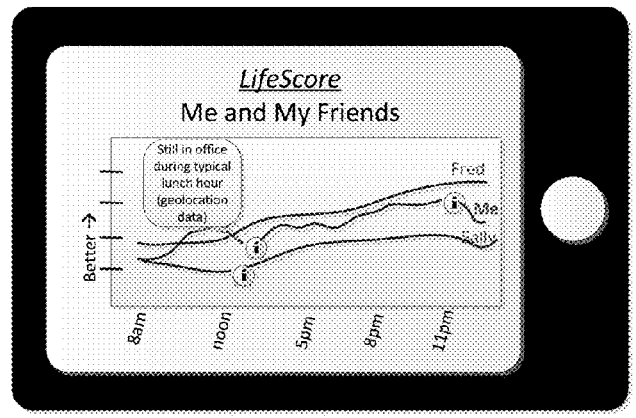
FIG. 6B illustrates a pop-up showing detailed information regarding one of the additional information icons for Jan Smith.

FIG. 6A illustrates the same LifeScore graphs as FIG. 5, but with additional information icons at various locations on the graph, depicted in this example as circled i's. Depending on the embodiment, the additional information icons may be located at different positions, such as locations where a LifeScore changed significantly (e.g., changed a predetermined amount or percentage), or at a location when one of a predetermined list of events occurred (as defined/selected by the individual and/or LifeScore provider). Advantageously, the user can select one of these additional information icons in order to view detailed information regarding the respective individual. For example, FIG. 6B illustrates a pop-up showing detailed information regarding one of the additional information icons for Jan Smith. In this embodiment, the additional information indicates that Jan was still in the office during a typical lunch hour, and further indicates what data was used to determine this detailed information (in this case, geolocation data, such as data from Jan's cell phone or an embedded RFID tag). In one embodiment, the fact that Jan was still in the office during her typical lunch hour is important based on past history of Jan's activities during the lunch hour. For example, if Jan's location during her typical lunch hour is at a local mall with many restaurants, but on the current day she did not leave the office during her lunch hour, that fact may impact Jan's life score. However, another individual that often takes lunches at a company cafeteria may not have his LifeScore impacted in response to detecting that he is still at the office during his typical lunch hour. Thus, the scoring system may be configured to score individuals based on their own particular likes, interests, habits, patterns, etc., where information regarding particular individuals may be obtained from various sources and/or derived by the scoring system.

Figure 6C:
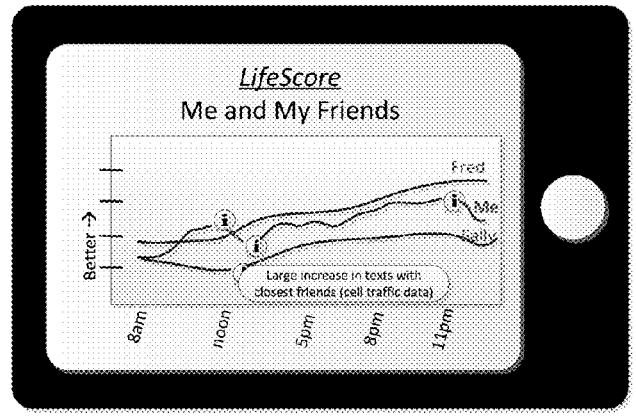
FIG. 6C illustrates detailed information regarding the LifeScore of an individual.

FIG. 6C illustrates detailed information regarding the LifeScore of Sally at just after noon. In this embodiment, the detailed information indicates a large increase in text messages with closest friends, and further indicates that this detailed information is based on cell phone traffic data. As noted above, different users can assign different rights to provide detailed information to others. Thus, Sallie may indicate that her friends (of which Jan is one) may view detailed information regarding her LifeScore, such as the information displayed in FIG. 6C. Sally may further indicate which detailed information, such as the quantity of text messages sent to specifically identified individuals in order to trigger the additional information icon, may or may not be available to Jan.

In one embodiment, milestones are created for individuals to reach in order to receive badges that may be displayed on the user's LifeScore page, LifeScore graphs, etc., and shared with others, such as the user's friends. For example, if the users LifeScore reaches a certain threshold, a badge may be provided. Similarly, if the user increases scores in various predefined components, the user may receive a different badge. In one embodiment, offers from partners may be based, at least partly, on whether or not a user has a particular badge, or they may be triggered in response to a user achieving a certain one or more badges.

Example Scoring Changes

Figure 7A:
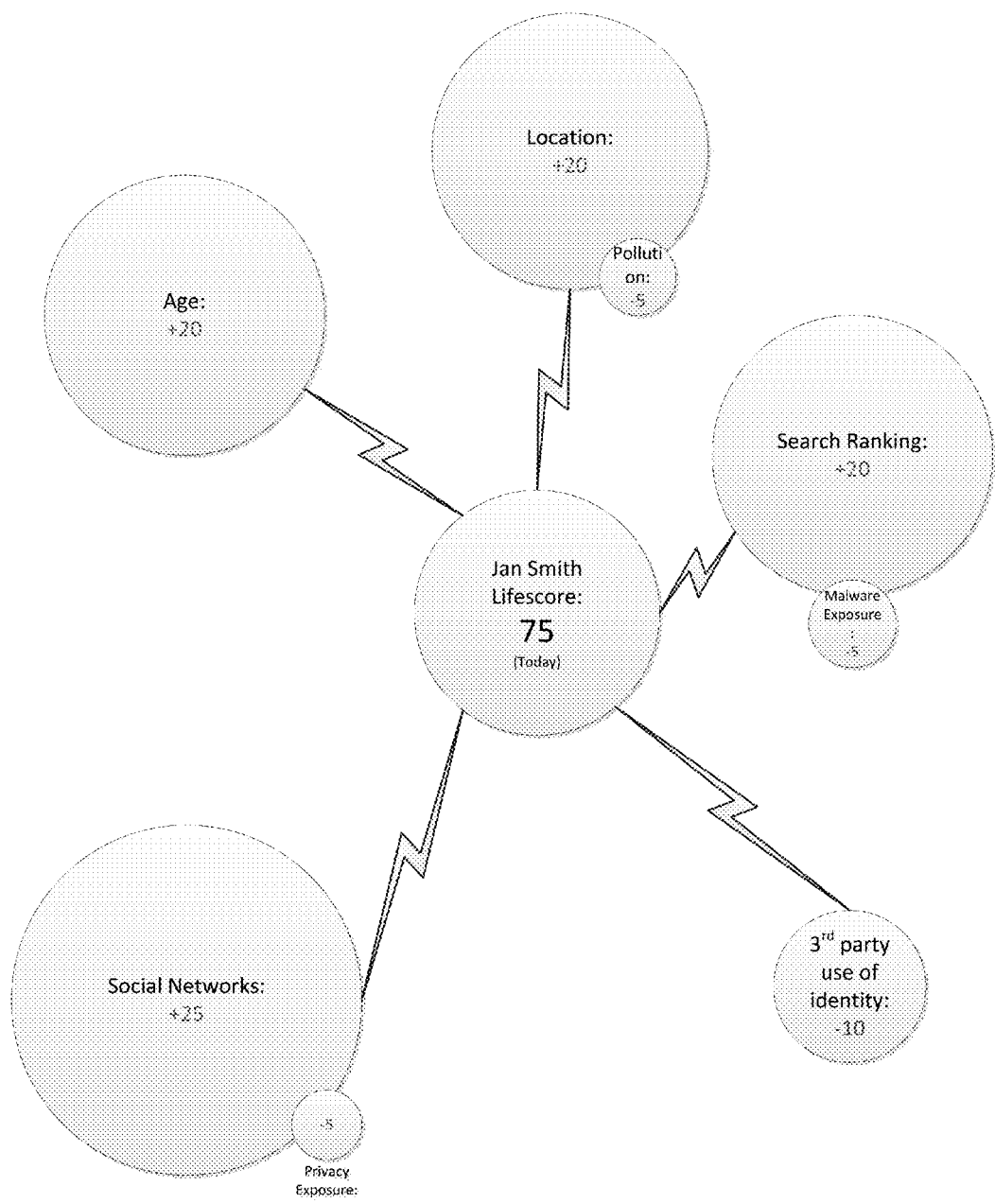
FIG. 7A is a diagram illustrating example components of a user's current LifeScore.

In one embodiment, the user can easily monitor historical LifeScores, and/or LifeScore components, in comparison with a current LifeScore and/or LifeScore components. For example, FIG. 7A is a diagram illustrating example components of a user's current LifeScore, such as the user Jan Smith discussed above. In the embodiment of FIG. 7A, Jan Smith has a current LifeScore of 75. Contributors to that LifeScore are her social network component score (which contributes +25 to the LifeScore), an age component score (which contributes +20 to the LifeScore) a location component score (which contributes +20 to the LifeScore, including a −5 decrease due to a pollution subcomponent of the location component score), the search ranking component score (which contributes +20 to the LifeScore, including a −5 decrease due to a malware exposure subcomponent of the search ranking component score), and a third-party use of identity component score (which decreases the LifeScore by 10).

Figure 7B:
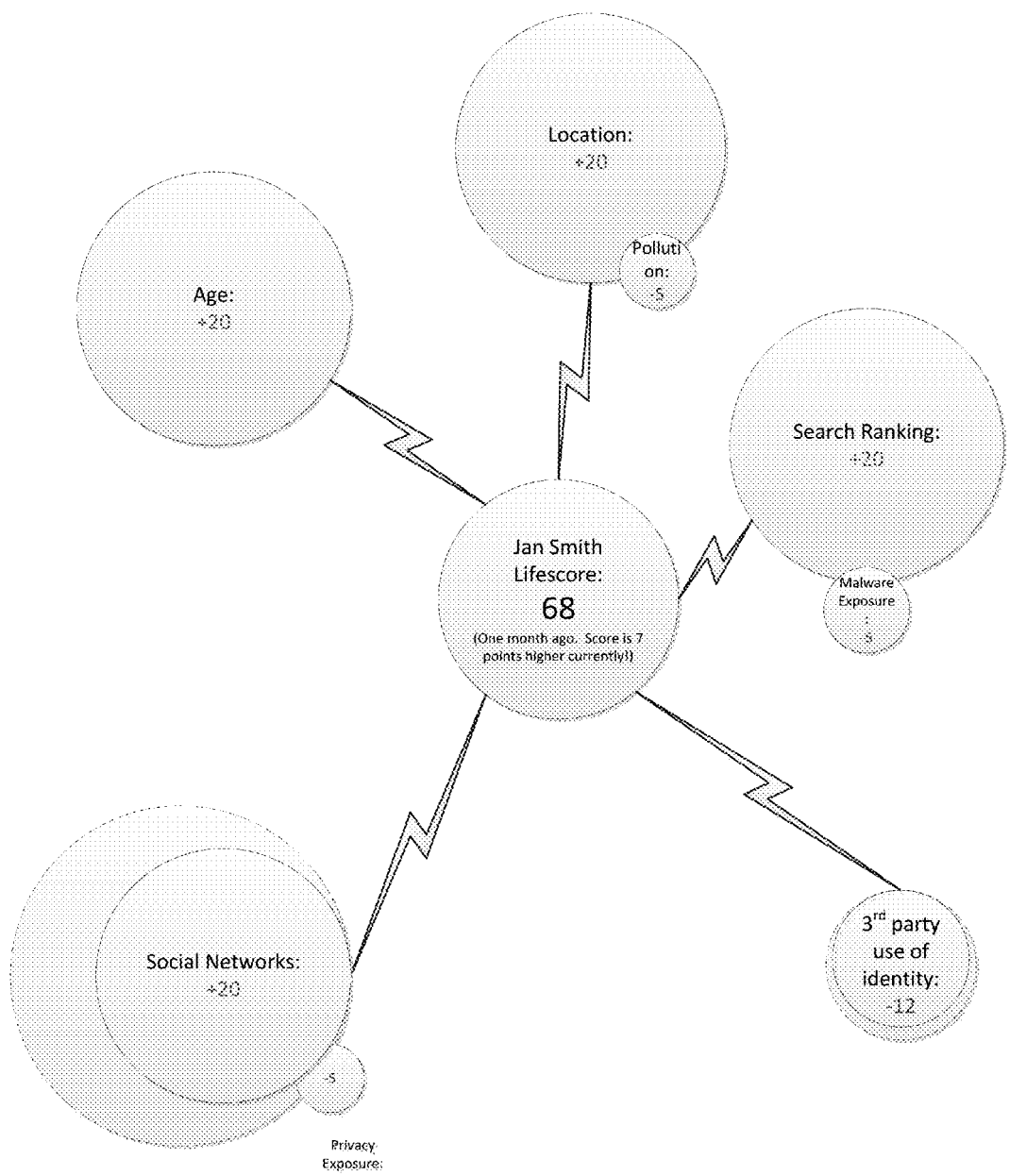
FIG. 7B is a diagram illustrating components of a user's current LifeScore compared to components of the user's LifeScore one month previous.
Figure 7C:
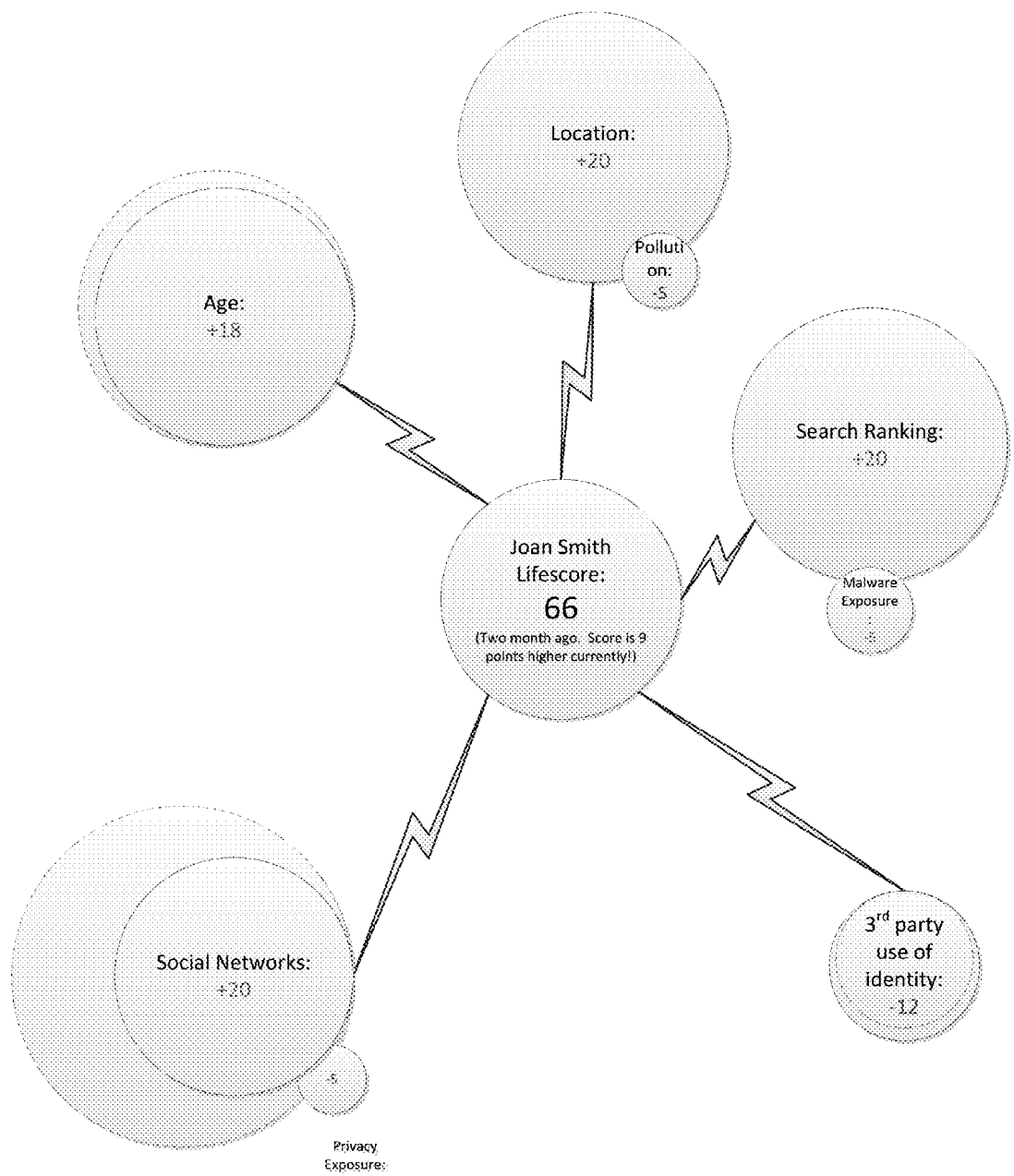
FIG. 7C is a diagram illustrating components of a user's current LifeScore compared to components of the user's LifeScore one month previous.

As shown in FIG. 7A, the various components of the users LifeScore can have individual strengths. In one embodiment, historical information regarding users LifeScores are stored and are made available to the user (and possibly authorized friends or others). For example, FIGS. 7B and 7C illustrate examples of changes in the users individual LifeScore components over a period of one month (FIG. 7B) and two months (FIG. 7C). In particular, in the example of FIG. 7B the broken line circles of the social networks and third-party use of identity components show the current component levels, while the solid line circles of the social network and third-party use of identity components where the component were at one month prior. In the center circle, the LifeScore one month previous is provided, e.g., 68 in this case, and information regarding the difference of the LifeScore compared with the current LifeScore is also provided.

Moving to FIG. 7C, the age component score has changed from two months prior and, accordingly, that change is illustrated by the difference between the broken line circle (representing a current level for the age component score) and the solid circle (representing the component score two months previous). In one embodiment, a user may quickly scroll through the diagrams of FIGS. 7A, 7B, 7C, and possibly diagrams that show even a further history, such that the changes in the various components of the users LifeScore can be monitored.

Figure 8A:
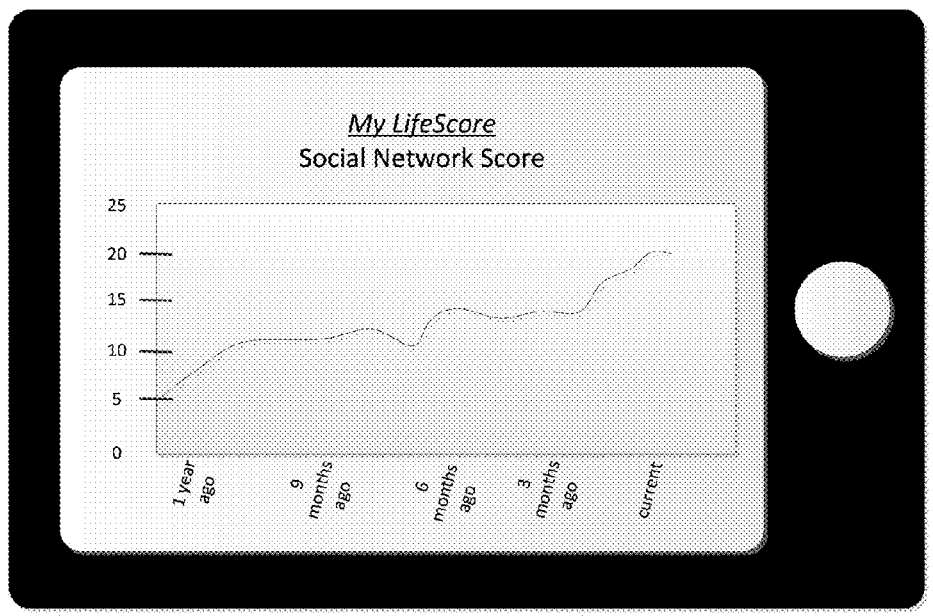
FIG. 8A illustrates a user interface that shows the change in the user's social network component score.
Figure 8B:
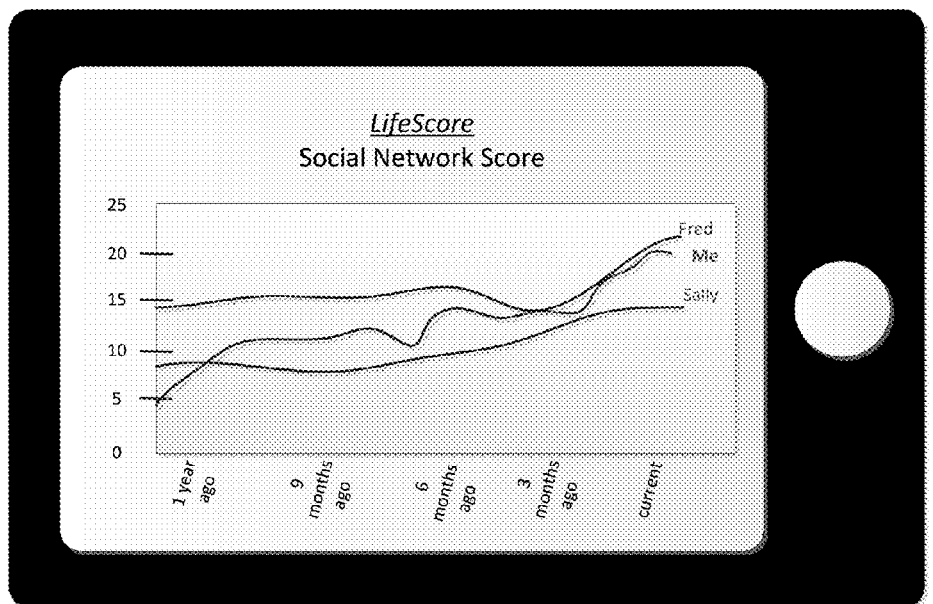
FIG. 8B illustrates a user interface that shows the change in the user's social network component score, as well as changes in the user's friend's social network component score over the same time period.

Various other user interfaces and methods of displaying LifeScores, as well as components of LifeScores, from current and/or previous times may also be used. For example, FIG. 8A illustrates a user interface that shows the change in the user's social network component score over a one year time period. In this embodiment, the example user's social networking component score increased from about 5 one year ago to about 20 currently. FIG. 8B illustrates the same one-year history of the user's social network component, but also shows changes in the social network component scores of other users, such as friends of the user.

Figure 9:
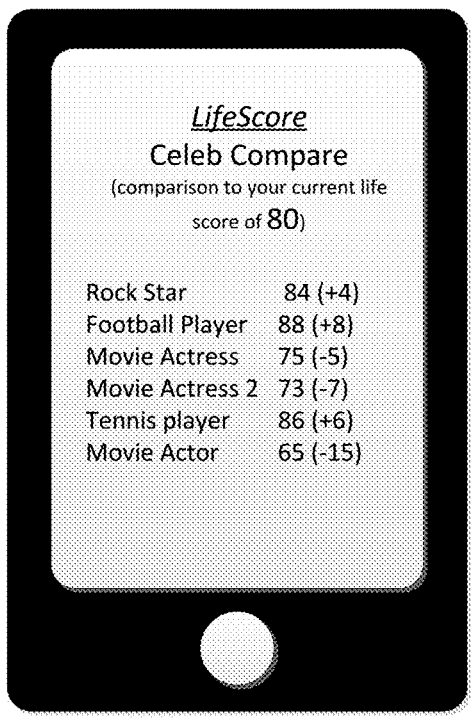
FIG. 9 illustrates another comparison user interface that allows the user to compare his/her LifeScore (or specific components of the user's LifeScore) with one or more famous individuals, or classes of individuals.

FIG. 9 illustrates another comparison user interface that allows the user to compare his/her LifeScore (or specific components of the user's LifeScore) with one or more famous individuals, or classes of individuals. While specific names are not provided in the example of FIG. 9, a particular rockstar, football player, actress, actor, etc., may be listed in the user interface of FIG. 9, with some indication of a difference between the individuals LifeScore and the identified famous individual's LifeScores. In a particular example of FIG. 9, the current LifeScore of each of the six famous individuals is shown, along with an indicator of a differential between those life scores and the current LifeScore of the user. In another embodiment, an average or normalized LifeScore for a class of celebrities may be provided, such as movie star, football player, TV star, etc., in order to provide the user a general indication of a difference between his/her LifeScore and individuals in other categories. In another embodiment, LifeScores of general occupations may be provided (beyond just famous occupations), as well as LifeScores based on other attributes such as residence city, state, country, school location, employer, marital status, religion, etc. Thus, with reference to a sample occupation LifeScore category, an individual may view average LifeScores for farmers, fishermen, attorneys, startup owners, etc., and compare such scores with the individual's LifeScore. Such information may be useful for high school or college age students in determining a career path.

Dashboard

FIG. 10 is a user interface that may be provided as a "dashboard" or homepage for a user accessing a LifeScore account (or a visitor to a LifeScore website), such as via a web browser or standalone application. Depending on the embodiment, the information provided on the dashboard may be customized, such as by the particular user or user group (e.g., students at a particular university may have the same set of default dashboard components).

In the embodiment of FIG. 8, a list of leading schools are provided on the left, general trends in various LifeScore groups are provided in the middle top, and trends in LifeScores of individuals having some association with the current user are provided in the middle bottom. The leading schools may provide specific school names, or generic descriptions of schools. If the individual to which the dashboard is provided is not a student, a different type of trending information may be provided, such as top employers or labor sectors. The trends in the middle top section may be based on occupation, life stage, residence, and/or a characteristic upon which a statistically significant change in LifeScores has been detected.

Finally, the information provided in the middle bottom section that relates to the current individual's LifeScore may include additional or less information. In other embodiments, other trend information may be provided, based on any one or more characteristics of individuals having LifeScores tracked, and the information may be provided via various user interfaces, such as textual lists, graphs, charts, or any other format.

Rewards

In one embodiment, a LifeScore user may gift rewards to other LifeScore users and/or potential users. For example, a user may receive a reward (e.g., based on reaching a particular LifeScore level) and assign the reward to another LifeScore user. Similarly, the user may assign the reward to an individual that is not yet a LifeScore user. Thus, assignment of a reward can lead to registration of new users in the LifeScore system. Gifting a reward to another user may affect one or more of the LifeScore components of the user.

Check-Ins and Photo Processing

In one embodiment, the LifeScore system may provide users with the ability to check-in at various locations (e.g., restaurants, shopping centers, residences, etc.). For example, the user can select a button on a mobile device in order to trigger forwarding of a location of the user to the LifeScore scoring device. The location may include GPS coordinates that can be associated with a particular business or residence either by the scoring device and/or the mobile device itself. In one embodiment, the check-in may include a photograph (e.g., taken from the user's mobile device) that may be stored by the scoring device and made accessible to the user and/or other authorized users. In one embodiment, the LifeScore system analyzes the uploaded photographs (to a LifeScore server, social networking site, photo storage site, or the like) to identify characteristics of the photographs. For example, image processing software may be executed in order to identify items in the photographs that may impact the LifeScore of the individual. Thus, uploaded images may be used to adjust the LifeScore of an individual, even without the user providing any information regarding the photograph.

Missions

In one embodiment, the LifeScore system includes missions that may be accomplished by LifeScore users in order to get rewards and/or to affect the LifeScore of the user. Missions may be competitive, such that statuses of completion of missions may be shared with others involved in the same mission, for example. Rewards and/or affects to users' LifeScores may be adjusted based on how the user performed in the mission in comparison with others participating in the mission. Users may select missions to participate in, such as by reviewing a list of available missions. In other embodiments, missions may be assigned to certain users, such as users in a certain geographic area, in a certain age range, with certain demographics, and/or any other certain characteristics.

Custom Scoring

In one embodiment, criteria that are used to develop LifeScores for respective individuals are customized based on the individual. Because individuals have different goals and priorities, use of a single scoring algorithm on all individuals may not accurately convey LifeScores of the various individuals. For example, a first individual that has a family that brings him joy beyond any other items may have a LifeScore that is graded more heavily on the family (and/or related) LifeScore components. Similarly, an entrepreneurial individual that is interested only in relationships that help him advance in the business world may be graded less heavily on the family (and/or related) LifeScore components.

In one embodiment, LifeScore scoring models are customized for individuals based on characteristics of another "model" individual, such that as the scored individual becomes more like the model individual (e.g. across multiple of the LifeScore components), the LifeScore increases. For example, an individual may have a LifeScore generated based on a model of a famous individual, such as a movie or sport star. The individual may have multiple LifeScores generated based on different models, such as 5 LifeScores based on different models indicating how closely the individual's life corresponds with 5 different movie stars.

In one embodiment, the LifeScore user selects actions/events or categories of actions/events that should be used (and/or selects actions/events or categories of actions that shouldn't be used) in calculating the user's LifeScore. Alternatively, or in addition to this more granular selection of criteria for generating LifeScores, the user may provide more general life goals from which the LifeScore system determines actions/events (and possibly weightings of such actions/events) to be used in calculating the user's LifeScore. For example, if a user indicates that a life goal is to retire by the age of 55, the user's LifeScore may be affected more heavily in response to changes in employment, longer/shorter work hours, investment decisions, and/or other actions of the user that would affect his ability to retire by the age of 55. In some embodiments, life goals may be provided and ranked. For example, a user may provide a top three (or other quantity) life goals and provide an order of importance of those life goals. Based on this information, the scoring system may determine how the various activities and characteristics associated with the user contribute to the users life score.

Sample User Interfaces on Mobile Device

FIGS. 11A-11H are sample user interfaces on a mobile device that show various features available from a LifeScore system. These user interfaces are examples of only certain features that a LifeScore system may provide. In other embodiments, additional features may be provided and they may be provided using various different user interfaces and software code. Depending on the embodiment, the user interfaces and functionality described with reference to FIG. 11 may be provided by software executing on the mobile device, by a scoring system located remotely that is in communication with the mobile device via one or more networks, and/or some combination of software executing on the mobile device and the scoring system.

FIG. 11A illustrates an example sign-up interface. In this embodiment, the user is asked for their first and last name, e-mail, and zip code. As noted above, in some embodiments the scoring system is configured to provide an initial LifeScore for a user based on minimal information initially provided by the user.

Moving to FIG. 11B, an initial LifeScore for the user is provided. In one embodiment, the illustrated LifeScore of 48 is based on characteristics of the user that are determined by only the name, e-mail and zip code provided in FIG. 11A. For example, demographic and/or psychographic characteristics of the user may be predicted based on the geolocation associated with the user ZIP code. Similarly, characteristics of the user may be predicted based on the users e-mail address, such as the domain address or keywords/characters in the user's e-mail address.

Next, in FIG. 11C, the user interface illustrates the categories/types of information that the LifeScore system is able to access. In some embodiments, the LifeScore software accesses information already available on the user's mobile device in order to establish connections with various data sources. For example, the user may have a fitness application on the mobile device that is configured to share data with the LifeScore application. In some embodiments, the LifeScore application may access text messages, e-mails, notes, and/or other data that may be analyzed and used in determining and/or updating the user's LifeScore. Similarly, the user may have a social networking account that is configured to allow the LifeScore application to access the user's social networking data. In some embodiments, the LifeScore application requests permission from the user to access/interface with information on the user's mobile device.

Moving to FIG. 11D, the user has selected the social category and is presented with a list of social networks that the LifeScore application can connect to. As noted above, the LifeScore application may automatically connect to the selected social networks or, in other embodiments, the user may provide their login credentials for the individual social networking sites when they are selected using the interface of FIG. 11D.

Figure 11H:
Figure 11G:
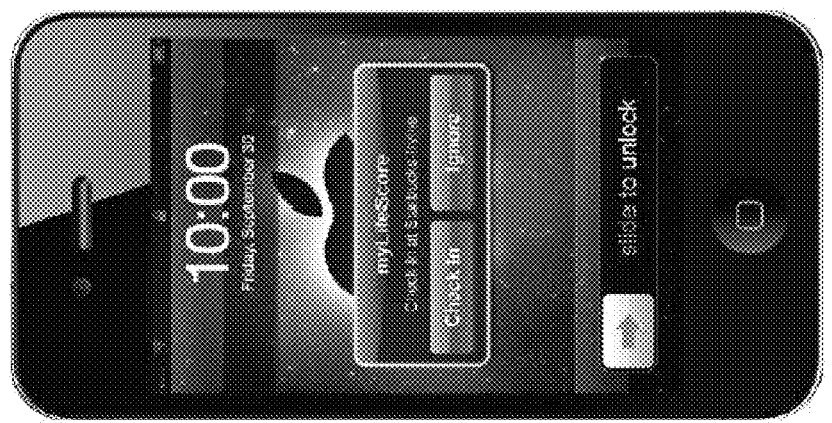
Figure 11F:
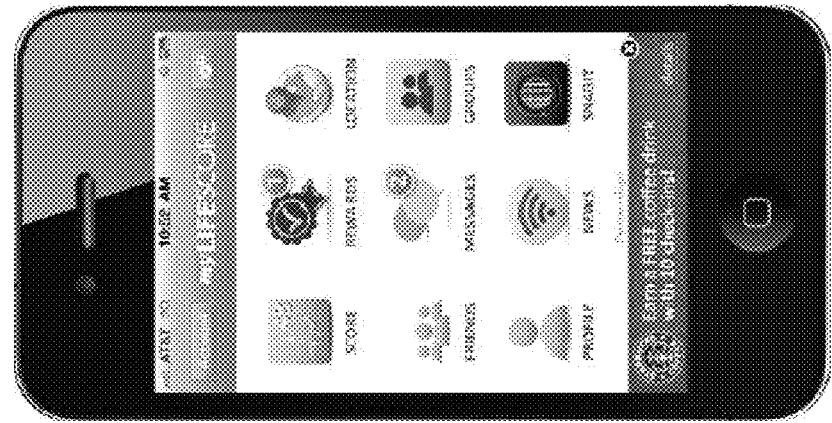
Figure 11E:
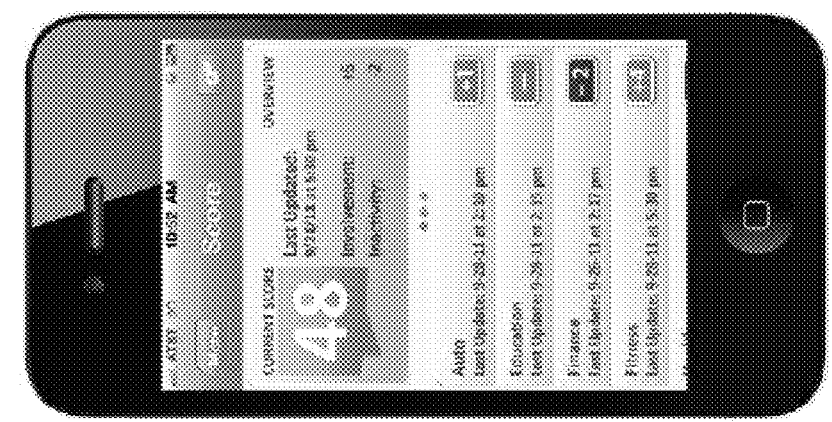

FIG. 11E illustrates a user interface that shows component scores that were used to calculate the users current LifeScore. In this embodiment, the user's LifeScore has received a positive contribution from the auto category (e.g., possibly the user has a sports car, a newer car, or just paid off an automobile loan) and the fitness category (e.g., possibly the user has met a fitness or weight goal or has multiple days of continuous trips to the gym). The user's LifeScore received no contribution from the education category, possibly because the user is not a student and is not interested in further education. The user's LifeScore in this embodiment received a negative contribution from the finance category, possibly based on any combination of financial data, such as changes in the user's credit score, outstanding balances, late payments, credit data, and/or any other related data.

FIG. 11F illustrates a dashboard that allows the user to navigate to various functions provided by the LifeScore application. As shown in this embodiment, the user has one reward waiting to be claimed. As noted above, rewards may be provided based on various criteria. In this embodiment, the user may have received a reward simply for registering with LifeScore, possibly in combination with the user's location.

FIG. 11G illustrates a check-in notification provided to the user. In some embodiments, the LifeScore application tracks the user's location in real time and provides notifications to the user when locations of interest (e.g., businesses) are nearby. In this embodiment, the LifeScore application has determined that the user is in/near a coffee house and asks the user to check in.

FIG. 11H illustrates a push notification of a reward provided to the user. As noted above, rewards may be provided based on various criteria. In this embodiment, the reward may be based on the user's first check-in with the particular coffee shop. Alternatively, the reward illustrated in FIG. 11H may be provided long after the user has visited the coffee shop (or even before the user ever visits the coffee shop) based on other reward criteria set by the coffee shop.

Example System Implementation

FIG. 12 is a block diagram showing an embodiment in which a scoring computing system 100 (or simply "computing system 100") is in communication with a network 160 and various systems are also in communication with the network 160. The computing system 100 may be used to implement systems and methods described herein. For example, the computing system 100 may receive registration information from consumer, receive information from various data sources regarding consumers, generate segment and/or LifeScores of consumers, provide various user interfaces reporting the LifeScores, and/or communication with partners.

The computing system 100 includes, for example, a personal computer that is IBM, Macintosh, or Linux/Unix compatible or a server or workstation. In one embodiment, the computing system 100 comprises a server, a laptop computer, a cell phone, a personal digital assistant, a kiosk, or an audio player, for example. In one embodiment, the exemplary computing system 100 includes one or more central processing unit ("CPU") 105, which may each include a conventional or proprietary microprocessor. The computing system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the computing system 100 are connected to the computer using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 12, the I/O devices and interfaces 110 provide a communication interface to various external devices. In the embodiment of FIG. 9, the computing system 100 is electronically coupled to a network 160, which comprises one or more of a LAN, WAN, and/or the Internet, for example, via a wired, wireless, or combination of wired and wireless, communication link 115. The network 160 communicates with various computing devices and/or other electronic devices via wired or wireless communication links.

According to FIG. 12, information is provided to the computing system 100 over the network 160 from one or more data sources. The data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 12, the computing system 100 also includes a scoring module 150 that may be stored in the mass storage device 120 as executable software codes that are executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 12, the computing system 100 is configured to execute the scoring module 150 in order to receive data regarding individuals and to generate LifeScore for the individuals, as well as any other functionality described elsewhere in this specification.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Other

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the scoring system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for determining a life score for a user, the system comprising:
    a data store configured to store information associated with a user
    a computing device in communication with the data store, the computing device configured to:
    receive, from the user, an indication of a life goal of the user;
    determine, based on the received life goal, a first aspect of a life of the user associated with the life goal and a second aspect of the user's life also associated with the life goal, wherein the first and second aspects are different and are selected from: work, family, hobbies, education, finance, health, automobile, credit, location, news, or social;
    based on the determined first aspect, determine a first subset of information on which a first aspect score is based;
    based on the determined second aspect, determine a second subset of information on which a second aspect score is based;
    access the first subset of information a first one or more remote computing systems;
    access the second subset of information from a second one or more remote computing systems;
    update the data store with the accessed first and second subsets of information;
    determine, based on the life goal, a first weighting for the first aspect in calculating a life score of the user;
    determine, based on the life goal, a second weighting for the second aspect in calculating the life score of the user, wherein the first and second weightings are different and are not dependent on the accessed first and second subsets of information;
    determine the first aspect score based on at least the first subset of information;
    determine the second aspect score based on at least the second subset of information;
    evaluate a life score algorithm based on at least:
    the first aspect score and the determined first weighting; and
    the second aspect score and the determined second weighting;
    wherein the life score algorithm generates the life score of the user;
    apply one or more offer rules to at least some of the information associated with the user; and
    in response to determining that the one or more offer rules are matched by the at least some of the information associated with the user, initiate transmission of an offer notification to an offer provider provide the generated life score to the user.

2. The system of claim 1, wherein the first and second one or more remote computing systems are associated with respective social networking sites, financial sites, storage sites, or other data repository.

3. The system of claim 1, wherein the computing device is further configured to:
receive, from a particular offer provider, the one or more offer rules,
wherein the offer notification is transmitted to the particular offer providers.

4. The system of claim 1, wherein the computing device is further configured to:
determine an initial life score of the user based on only a name, an email address, and an educational institution or an employer associated with the user.

5. The system of claim 1, wherein the computing device is further configured to:
provide one or more of the first aspect score, the second aspect score, and the life score to one or more friends of the user.

6. The system of claim 5, wherein the computing device is further configured to:
access social network data of the user in order to determine the one or more friends of the user.

7. The system of claim 1, wherein the computing device is further configured to:
provide, to the user, generating a graph illustrating changes in the user's life score over a prior time period.

8. The system of claim 7, wherein the prior time period is one hour, one day, one week, one month, or one year.

9. The system of claim 7, wherein the graph further illustrates changes of respective life scores of one or more friends of the user over the same prior time period.

10. The system of claim 7, wherein the graph includes user interfaces configured to provide information regarding changes of a predetermined amount to the user.

11. The system of claim 1,
wherein the computing device is further configured to:
customize the life score algorithm determining the life score of the user is based on a custom scoring model generated for the user.

12. The system of claim 11, wherein the custom life score algorithm is based on the information associated with the user.

13. The system of claim 11, wherein the custom life score algorithm is based on information provided by the user.

14. The system of claim 11, wherein the custom life score algorithm is based on characteristics of another user, wherein the user's life score increases as characteristics of the user approach corresponding characteristics of the another.

15. The system of claim 14, wherein the another is a famous individual.

16. A method for determining a life score of a user, the method comprising:
receiving, from the user, an indication of a life goal of the user;
determining, based on the received life goal, a first aspect of the user's life associated with the life goal and a second aspect of the user's life also associated with the life goal, wherein the first and second aspects are different and are selected from: work, family, hobbies, education, finance, health, automobile, credit, location, news, or social;
based on the determined first aspect, determining a first subset of information on which a first aspect score is based;
based on the determined second aspect, determining a second subset of information on which a second aspect score is based;
accessing the first subset of information from a first one or more remote computing systems;
accessing the second subset of information from a second one or more remote computing systems;
receiving from the user an indication of one or more life goals of the user;
determining weightings for components of a life score algorithm usable to calculate a life score of the user, said determining comprising:
determining, based on the life goal, a first weighting for the first aspect in calculating a life score of the user;
determining, based on the life goal, a second weighting for the second aspect in calculating the life score of the user, wherein the first and second weightings are different and are not dependent on the accessed first and second subsets of information;
determining a first component aspect score associated with based on at least the first aspect of the user's life, based on at least the accessed subset of information associated with the first aspect;
determining a second component aspect score associated with based on at least the second aspect of the user's life, based on at least the accessed subset of information associated with the second aspect;
evaluating a life score algorithm based on at least:
the first aspect score and the determined first weighting; and
the second aspect score and the determined second weighting;
wherein the life score algorithm generates the life score of the user;
applying one or more offer rules to information regarding the user including at least one of the first aspect score, the second aspect score, or the life score; and
in response to determining that the one or more offer rules are matched by the information regarding the user, initiating transmission of an offer notification.

17. The method of claim 16, further comprising:
receiving, from an offer provider, the one or more offer rules,
wherein the offer notification is transmitted to the offer.

18. A non-transitory computer-readable medium storing instructions configured to cause one or more computer processors to perform operations comprising:
receiving, from the user, an indication of a life goal of the user;
determining, based on the received life goal, a first aspect of a user's life associated with the life goal and a second aspect of the user's life also associated with the life goal, wherein the first and second aspects are different and are selected from: work, family, hobbies, education, finance, health, automobile, credit, location, news, or social;
based on the determined first aspect, determining a first subset of information on which a first aspect score is based;
based on the determined second aspect, determining a second subset of information on which a second aspect score is based;
accessing the first subset of information from a first one or more remote computing systems;

accessing the second subset of information from a second one or more remote computing systems;

receiving from the user an indication of one or more life goals of the user;

determining weightings for components of a life score algorithm usable to calculate a life score of the user, said determining comprising:

determining, based on the life goal, a first weighting for the first aspect in calculating a life score of the user;

determining, based on the life goal, a second weighting for the second aspect in calculating the life score of the user, wherein the first and second weightings are different and are not dependent on the accessed first and second subsets of information;

determining a first component aspect score based on at least associated with the first subset of aspect of the user's life, based on at least the accessed information associated with the first aspect;

determining a second aspect component score based on at least associated with the second subset of aspect of the user's life, based on at least the accessed information associated with the second aspect;

evaluating a life score algorithm based on at least:
the first aspect score and the determined first weighting; and
the second aspect score and the determined second weighting;
wherein the life score algorithm generates the life score of the user; and
applying one or more offer rules to information regarding the user including at least one of the first aspect score, the second aspect score, or the life score; and
in response to determining that the one or more offer rules are matched by the information regarding the user, initiating transmission of an offer notification.

19. The non-transitory computer-readable medium of claim 18, wherein the operations further comprise:
receiving, from an offer provider, the one or more offer rules,
wherein the offer notification is transmitted to the offer.

20. The method of claim 16, further comprising:
accessing social network data of the user in order to determine one or more friends of the user; and
providing one or more of the first aspect score, the second aspect score, and the life score to one or more of the determined friends of the user.

* * * * *